Dec. 26, 1961     E. A. STALKER     3,014,691
TURBINE ROTOR
Filed June 4, 1958     2 Sheets-Sheet 1
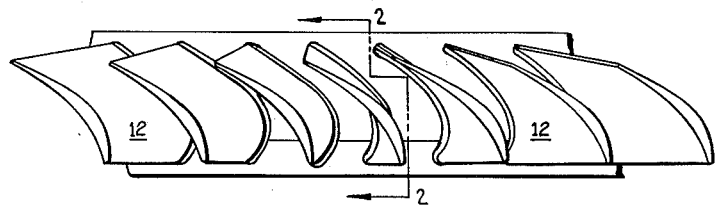
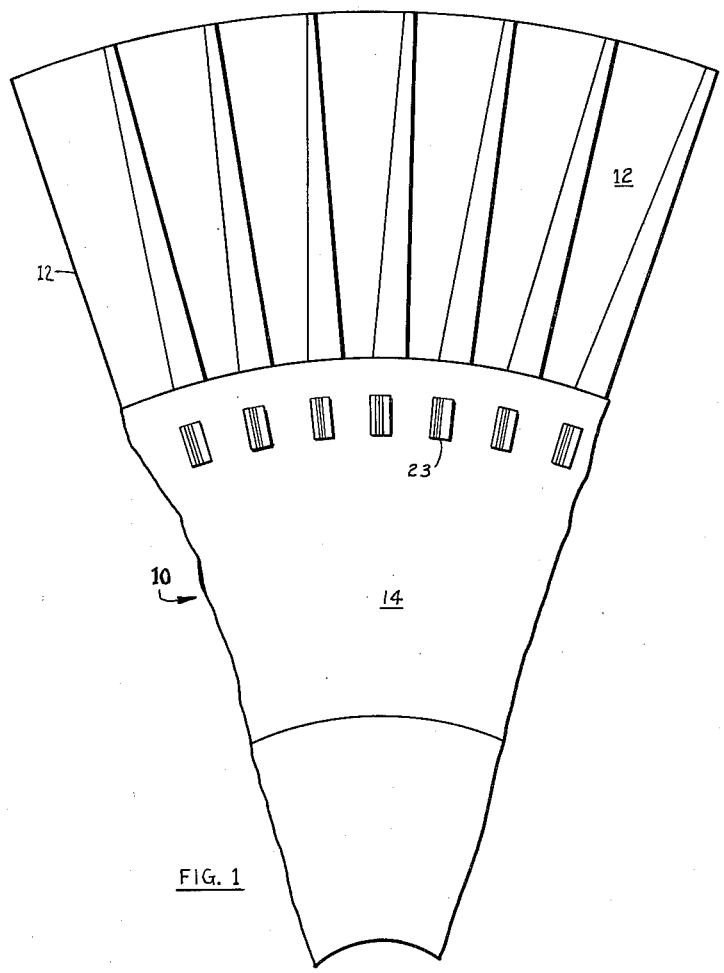
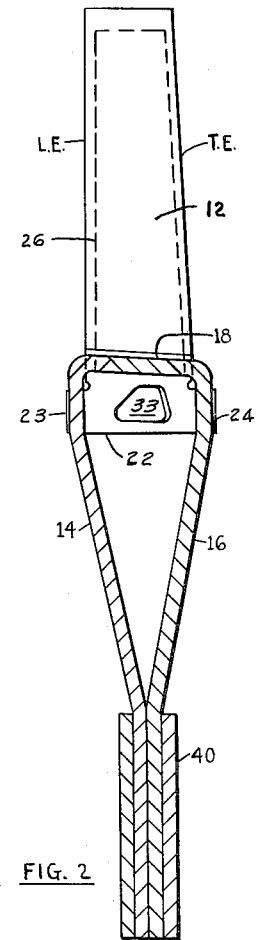
INVENTOR.
Edward A. Stalker INVENTOR.
Edward A. Stalker 3,014,691
TURBINE ROTOR
Edward A. Stalker, 406 N. Farragut St., Bay City, Mich.
Filed June 4, 1958, Ser. No. 739,831
3 Claims. (Cl. 253—39)

My invention relates to bladed rotors for turbines.

An object of my invention is to provide a turbine rotor of light weight.

Another object is to provide a turbine rotor which is cheap to make.

Still another object is to provide a turbine rotor having hollow blades which is light and economical to produce.

The above objects are accomplished by the means illustrated in the accompanying drawings in which—

FIG. 1 is a fragmentary axial view of a turbine rotor according to my invention;

FIG. 2 is a fragmentary section on line 2—2 in FIG. 3;

FIG. 3 is a fragmentary view of the blades of the rotor as seen from the blade tips;

Figure 5:
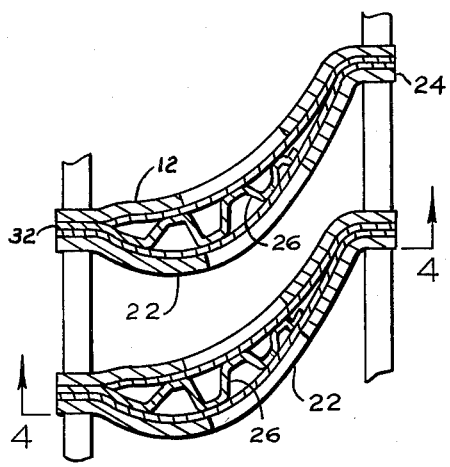
FIG. 5 is a fragmentary section on line 5—5 in FIG. 4.
Figure 8:
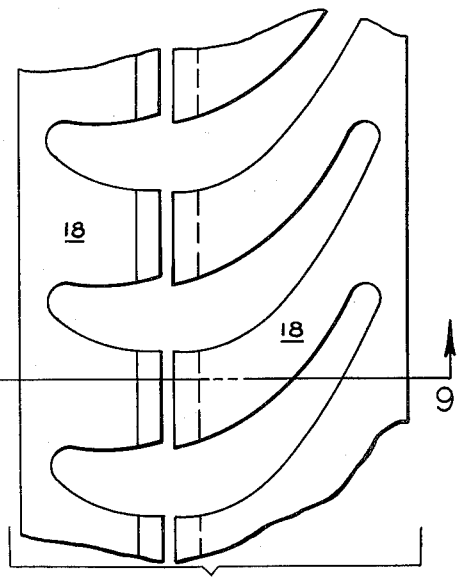
FIG. 8 is a fragmentary view of the complementary rim parts.
Figure 6:
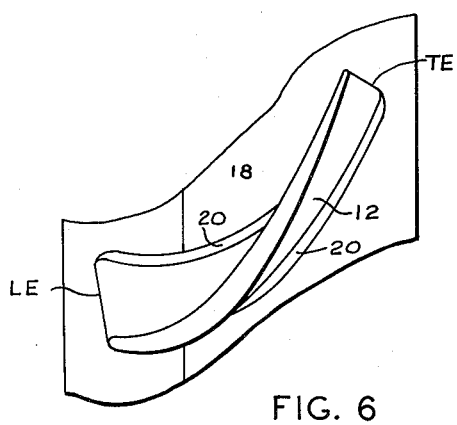
FIG. 6 is a fragmentary tip view of a blade.
Figure 9:
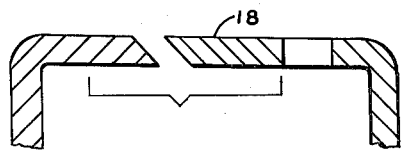
FIG. 9 is a fragmentary section on line 9—9 in FIG. 8.
Figure 4:
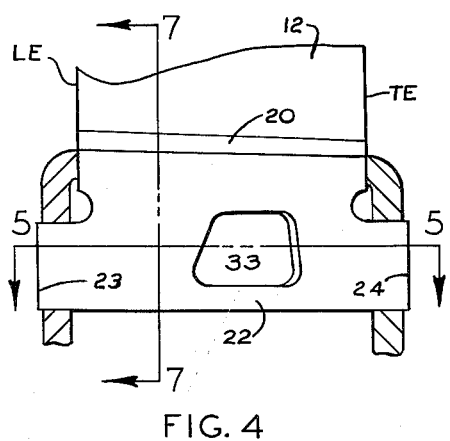
FIG. 4 is a fragmentary enlarged radial section on line 4—4 in FIG. 5.

A blade of a gas turbine operates at very high temperatures and tip speeds. This means that the material of the blade is highly stressed while its ability to carry high stresses is greatly reduced by the temperature, compared to its strength at room temperatures. However by making the blade hollow and of light weight, even large blades can be sustained against centrifugal forces by properly designed tenons engaged in the side disks. Thus the rim is not subjected to the blade loads and can be thin and light. The rotor then is light because of the light weight attaching tenons and root portion as well as the light weight rim.

Referring to the drawings the rotor is indicated generally as 10. It comprises the blades 12 spaced peripherally about the rim of the hub means. The latter comprises the generally circular side disks 14 and 16 and the rim 18 fixed to the disks. Since this is a turbine rotor it has a plurality of blades in each quadrant of the rotor about the axis of rotation thereof. The blades terminate radially inward of the rim means preferably nearer thereto than to the rotor axis.

Figure 7:
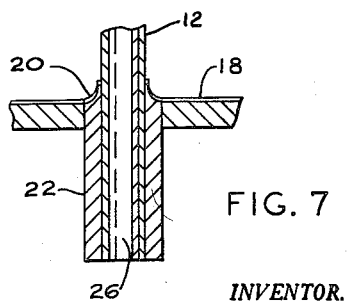
FIG. 7 is a fragmentary section on line 7—7 in FIG. 4.

The hollow blades have blade bodies defined by opposite walls increasing in thickness inward from the tip portions. At the rim they increase rapidly in thickness defining fillets 20 which fair with the rim as in FIG. 7. These fillets each have a concave surface which fares into the surface of the blade body at the termination of the fillet. They alleviate stress concentrations in the blades at the rim. The blade wall thickness at the rim is extended radially inward forming the integral root body 22 of the blade. This portion has front and rear tenons 23 and 24 respectively at the leading edge L.E. and trailing edge T.E. positioned in the peripherally spaced holes in the side disks. The tenons have a substantial radial length and are directed in the general chordwise or axial direction. Each tenon fits closely to the surface of its hole putting it within brazing reach of the surface of the hole to which it is brazed or fixed by other fused metal. Brazing clearance should be less than about 0.006 inch.

Preferably the blade is strengthened by the corrugated beam means 26 which is bonded to the opposite walls of the blade along the lands of the corrugations.

The beam means as shown particularly in FIG. 5 has a tongue 32 projecting forward and bonded between the parts of the tenon.

The recesses 33 lighten the weight of the blade root body.

The beam means preferably extends throughout the major portion of the radial length or span of the blade as shown in FIG. 2.

The blades are brazed to the rim wall so that the surface of each fillet fairs into the surface of the rim.

The side disks are dish shaped with their central portions more closely adjacent than the rims. The rims have complementary tapered edges for bonding together to give a smooth rim. The central portions are also fixed together preferably by braze and may be reinforced by disks 40 when required, as when holes are put through the disks for attachment to a shaft or the like.

The invention facilitates construction of the rotor from sheet metal. Thus the side disks are pressed or drawn to shape from a sheet of metal. The holes to receive the tenons are punched by dies as for sheet metal fabrication. The blades are readily formed from sheet metal.

The hollow blades are light enough even in large sizes to make practical the use of the blade securing means described even for rotor operating under such adverse conditions as turbine rotors with their high temperatures and tip speeds.

While I have illustrated specific forms of the invention, it is to be understood that variations may be made therein and that I intend to claim as my invention broadly as indicated by the appended claims.

I claim:

1. In combination in an axial flow rotor for compressors, turbines and the like, axially spaced disks fixed one to the other, a plurality of peripherally spaced hollow blades received between said disks and extending radially outward beyond the perimeters thereof, rim means carried in said rotor adjacent said perimeters and extending from blade to blade and from front to rear thereof to sustain variations in fluid pressure, a beam means within each said blade bonded to opposite walls thereof and extending radially inward to the root of said blade, said blade having opposite walls of increasing thickness forming a fillet fairing with the axially directed surface of said rim means and continuing inward over said root body of said blade, said blade having tenons at front and rear thereof comprising portions of said blade walls and said beam means, said side disks having peripherally spaced holes therein adjacent said perimeters receiving said tenons therein in closely fitting relation to the surfaces thereof to sustain said blades, and means bonding said securing tenons to the surface of said holes.

2. In combination in an axial flow rotor for compressors, turbines, and the like, axially spaced disks fixed one to the other to define a hub means of hollow interior over the major portion of the radial extent thereof, and oppositely spaced walls defining a plurality of peripherally spaced hollow blades received between said disks in each quadrant of said rotor and extending radially outward beyond the perimeters thereof, said hub means including rim means carried by said rotor adjacent said perimeters and extending from blade to blade and from front to rear thereof to sustain variations in fluid pressure, each said blade having said opposite spaced walls of increased thickness forming a blade root body radially inward of said rim means, said opposite spaced walls of each said blade decreasing in thickness radially outward from said rim means to provide a fillet fairing into said blade surface at the termination of said fillet closely adjacent said rim means radially outward thereof, said fillet having a concave surface over substantially the whole radial extent thereof from said rim means to said termination of said fillet for alleviating stress concentration in said blade at the junction of said blade and rim, said fillet surface also fairing with the external surface of said rim means, each said blade root body having integral tenons at front and rear thereof partaking of said increased wall thickness, said side disks having peripherally spaced holes therein adjacent said perimeters receiving said tenons therein in closely fitting relation to the surfaces thereof to sustain said blades.

3. The combination of claim 2 wherein said side disks are dish shaped with their central portions more closely adjacent than their radially outward portions.

References Cited in the file of this patent

UNITED STATES PATENTS

| | | |
|---|---|---|
| 1,363,692 | Summers | Dec. 28, 1920 |
| 1,835,913 | Squires | Dec. 8, 1931 |
| 1,876,067 | Lorenzen | Sept. 6, 1932 |
| 2,772,851 | Stalker | Dec. 4, 1956 |
| 2,801,071 | Thorp | July 30, 1957 |
| 2,880,926 | Stalker | Apr. 7, 1959 |